United States Patent [19]
Muller

[11] Patent Number: 5,345,057
[45] Date of Patent: Sep. 6, 1994

[54] METHOD OF CUTTING AN APERTURE IN A DEVICE BY MEANS OF A LASER BEAM

[75] Inventor: Fritz Muller, Lake Zurich, Ill.

[73] Assignee: Lasag AG, Thun, Switzerland

[21] Appl. No.: 37,187

[22] Filed: Mar. 25, 1993

[51] Int. Cl.$^5$ .............................................. B23K 26/00
[52] U.S. Cl. ............... 219/121.71; 219/121.84
[58] Field of Search ............ 219/121.84, 121.7, 121.71

[56] References Cited

U.S. PATENT DOCUMENTS 5,073,694 12/1991 Tessier et al. ..................... 219/121.7

FOREIGN PATENT DOCUMENTS 8903274 4/1989 PCT Int'l Appl. ............. 219/121.71

Primary Examiner—C. L. Albritton
Attorney, Agent, or Firm—Pollock, Vande Sande & Priddy

[57] ABSTRACT

The invention relates to a method of cutting an aperture in a device (1) by means of a laser beam (9), said device comprising a wall (2) having first (5) and second (6) opposing surfaces, and a third surface (7) separated from said wall (2) along the path (11) of said laser beam (9), said method comprising the steps of:
(a) causing said laser beam (9) to be incident upon said first surface (10) so as to cut through said wall (2) and form said aperture, and
(b) introducing fluid between said second (6) and third (7) surfaces in the path (11) of said laser beam (9) so as to thereby prevent damage to said third surface (7) when said laser beam has cut through said wall.

The invention may be used to cut aperture in devices such as injector nozzles syringe needles, medical stents and fluid/air control valves.

7 Claims, 2 Drawing Sheets

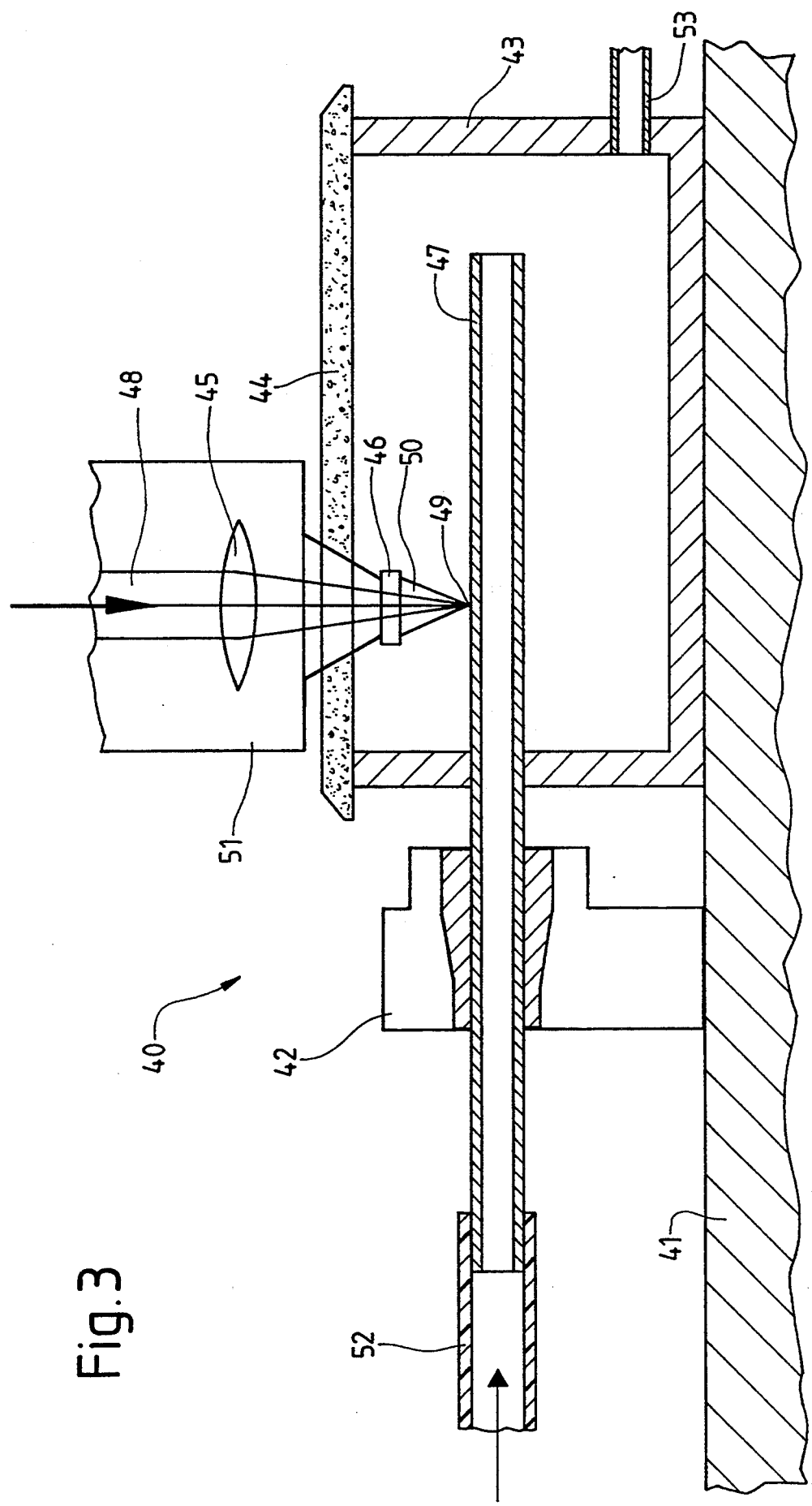

METHOD OF CUTTING AN APERTURE IN A DEVICE BY MEANS OF A LASER BEAM

BACKGROUND OF THE INVENTION

1. Field of the Invention

This invention relates generally to a method for cutting an aperture in a device, and more particularly to a method for cutting an aperture in a device comprising a wall having first and second opposing surfaces, and a third surface separated from said wall. The method is suitable for cutting apertures in a wall of narrow pieces of tubing, and it will be convenient to hereinafter disclose the invention in relation to that exemplary application. It is to be appreciated, however, that the invention is not limited to that application.

2Description of the Prior Art

Many devices manufactured today require the cutting of an aperture in a wall thereof. Devices such as injector nozzles, syringe needles, medical stents, fluid-/air control valves and small collets all have bores or openings running therethrough which define at least one wall surrounding the bore or opening. In each of these devices, at least one aperture is required to be cut through the wall, so as to thereby enable, for example, the communication of a fluid with the bore in the device, or so as to alter the flexibility or other mechanical properties of the device. Moreover, many of these devices are small and require the aperture to be cut with a high degree of precision.

One existing method of accurately cutting such an aperture uses a process called Electrical Discharge Machining (EDM). The EDM process uses spark erosion to cut the aperture in the device, which, using this process, must be metallic. The device acts as a cathode, whilst the anode is provided by an electrode maintained very close to the surface of the device. Both the anode and the cathode are submerged in a dielectric liquid. High local temperatures are produced by passing a current through the gap between the device and the electrode, thus detaching and repelling particles from the device.

The EDM process can be classified according to two related techniques: a wire cutting technique and a sinker technique. In the wire cutting technique, a starting hole has to be firstly drilled in the wall of the device at the location where the cutting of the aperture is to commence. A wire, typically between 0.1-0.2 mm in diameter, is used as the anode and must be passed through the drilled hole. Current is then passed between the wire and the device so that particles from the device are detached. The wire is moved through the thickness of the wall, at a speed limited by the rate of particle detachment, so as to define the form of the aperture.

In the sinker technique, a copper or graphite electrode is placed close to the exterior surface of the wall through which the aperture is to be cut. Current is passed between the device and the electrode so that particles from the wall of the device are detached, the resulting aperture having the same form as that of the electrode. While this technique does not require the preliminary drilling of a hole, the electrode must however be precisely shaped to that of the desired aperture.

It can thus be understood that both EDM techniques are time and labour intensive in their preparation and in addition are limited in their cutting speed.

It is also known to cut apertures through the walls in such devices by the process of chemical etching. According to this process, a mask is placed on the exterior surface of the device, which mask has an opening defining the form of the aperture to be cut. When placed in a chemical bath, the aperture is etched though the device in the region of the opening of the mask. A separate mask must be produced for each device to be treated. Additionally, while chemical etching is often used in the treatment of flat, thin surfaces, the difficulty in the production and location of appropriate masks means that this process is not well suited to the cutting of apertures in walled-devices.

Milling is another process which is sometimes used to cut apertures in the walls of such devices. However the use of this process requires the removal of material by force from the wall of a device. Such force can cause the deformation of the device, particular in small, delicate devices such as syringe needles and injection nozzles.

SUMMARY OF THE INVENTION

It is an object of the present invention to provide a method for cutting an aperture in a device comprising a wall having first and second surfaces, and a third surface separated from said wall, which method alleviates the disadvantages of known methods.

Another object of the present invention is to provide a method for cutting an aperture in a device comprising a wall having first and second surfaces, and a third surface separated from said wall, which method uses a laser beam to cut said aperture.

With these objects in mind, the present invention provides a method of cutting an aperture in a device by means of a laser beam, said device comprising a wall having first and second opposing surfaces, and a third surface separated from said wall along the path of said laser beam, said method comprising the steps of:

(a) causing said laser beam to be incident upon said first surface so as to cut through said wall and form said aperture, and (b) introducing fluid between said second and third surfaces in the path of said laser beam so as to thereby prevent damage to said third surface when said laser beam has cut through said wall.

The introduction of a fluid in a device between the wall and a surface separated from the wall along the path of said laser beam, enables a laser beam to be used to cut an aperture through the wall of the device. When the laser beam has cut from one surface through to the other surface of the wall, it strikes the fluid, rather than a third surface in its path, and thus acts to prevent damage to this third surface. As a result, an aperture in such a device can be cut more quickly and economically than with existing methods. The quality and accuracy of the cut are also improved compared to known methods.

BRIEF DESCRIPTION OF THE DRAWINGS

The above objects, features and advantages of the present invention will become apparent from the description of the invention which follows, taken in conjunction with the accompanying drawings, wherein.

DETAILED DESCRIPTION OF THE INVENTION

The present invention will be described in detail with reference to the accompanying drawings which illustrate preferred embodiments according to the present invention.

Figure 1:
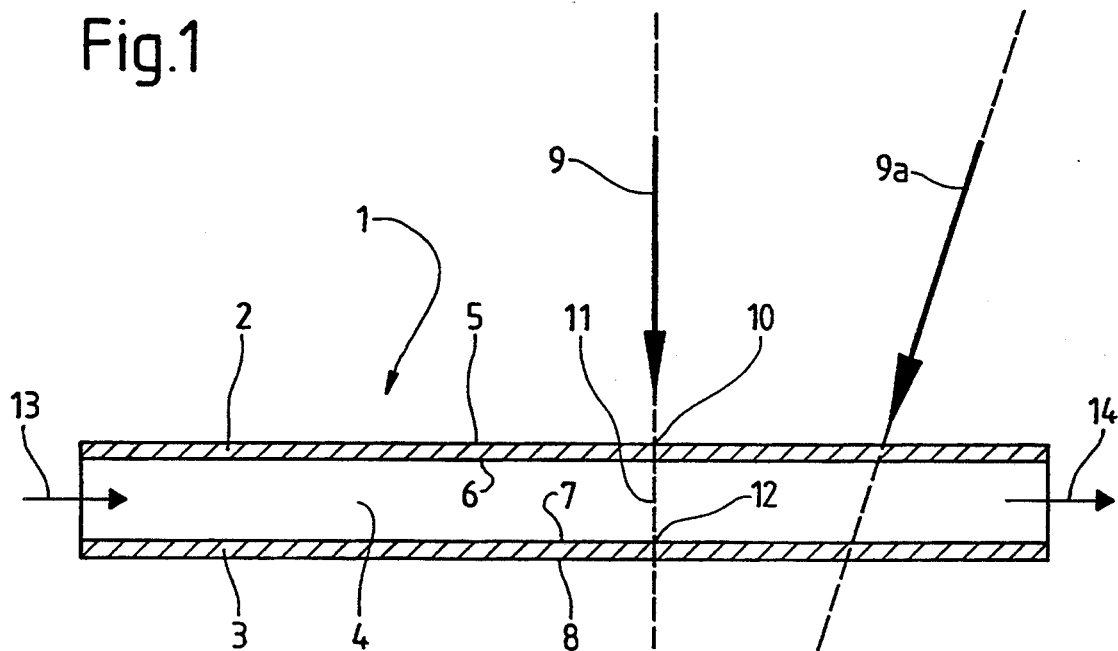
FIG. 1 is a schematic cross-sectional view of a device having a wall through which an aperture may be cut according to the method of the present invention.

Referring to FIG. 1 there is generally shown a cross-sectional view of a device 1 having two walls 2 and 3 and an opening 4 therebetween. The wall 2 is bounded by an exterior surface 5 and an interior surface 6. Similarly, the wall 3 is bounded by an interior surface 7 and an exterior surface 8. In some applications, the walls 2 and 3 may be separated from each other, but in other applications, the walls 2 and 3 may be directly connected together or, as is the case with a tube-like device, integral with each other. The device 1, and in particular the walls 2 and 3, may be made from mainly metallic material. This material may further include diamond, graphite, ceramic or other particles selected to give the device 1 certain desired mechanical properties. The device 1 may also be made, depending upon the application, entirely from non-metallic materials.

In order to cut an aperture in the wall 2 of the device 1, a laser beam 9 is caused to be incident upon the surface 5 at a desired location 10. An Nd.Yag, $CO_2$ or other type of laser may be used to supply the laser beam 9. An Nd.Yag laser, either of the pulsed or Q-switch type, is generally preferred when the device to be cut is made from mainly metallic materials whilst a $CO_2$ laser is generally preferred for cutting non-metallic materials. The laser beam 9 is produced so as to have sufficient intensity to cut through the wall 2 of the device 1. The location 10 at which the laser beam 9 strikes the surface 5 is subsequently altered, so that the laser beam 9 is caused to cut an aperture of appropriate size and shape in the wall 2. Although the laser beam 9 is shown as striking the surface 5 at an angle approximately perpendicular thereto, any appropriate angle of incidence may be chosen, such as that shown by the reference 9a, depending on the desired angle of the cut through the wall 2. In an exemplary application involving the cutting of an aperture through a wall of a mainly metallic device, a laser beam was found to cut at a rate 5–10 times that achieved using EDM.

It can be seen from FIG. 1 that when the laser beam 9 has cut through the wall 2, if its energy is not dissipated, it could continue on a path 11 until it strikes the surface 7 at a location 12. The surface 12 could thus be damaged, and even an unwanted aperture could be cut through the wall 3. In order to prevent damage to the surface 7, fluid is introduced into the opening 4 of the device 1 in the path 11 of the laser beam 9. This fluid acts to dissipate the energy of the laser beam 9 so that the remaining portion, if any, of the beam which is incident upon the surface 9 will not cause any damage thereto. The fluid also acts to cool the wall 2, so as to diminish the effect of heat on the finished device 1 caused during the cutting of the aperture.

Depending upon the application, this fluid may conveniently be water from a conventional water supply. In cases where the use of water may lead to corrosion or rusting of the device 1, a mixture of water and an anti-corrosion agent, such as oil, may be used. It will be appreciated that the exact composition of the fluid used in each application will depend upon the material from which the device 1 is made, the energy of the laser beam 9, the ability of the fluid to dissipate this energy and the distance separating of the surfaces 6 and 7. The intensity of the laser beam 9 may also be adjusted so that most of its energy is used to cut the aperture in the wall 2, only a small portion of its energy being thus able to continue on the path 12 for dissipation by the fluid in the opening 4.

Preferably, the fluid is caused to flow between the surfaces 6 and 7. In the embodiment shown in FIG. 1, the device 1 is open-ended, so that the fluid may be introduced from one end, as indicated by the reference 13, and thus leaving the device 1 from the other end, as indicated by the reference 14. This advantageously helps to flush away the molten material cut from the wall 2 by the laser beam 9, thus improving the quality of the finish of the cut. As the velocity of the fluid is increased in the opening 4, the fluid is able to flush away greater amounts of molten material more quickly. The energy of the laser beam 9 is also more rapidly dissipated along the path 12 when the fluid in the opening 4 is caused to flow across the path 12. The velocity at which the fluid to caused to flow between the surfaces 6 and 7 will depend upon the size of the opening 4 and the pressure of the fluid supplied to one end of the device 1.

Figure 2:
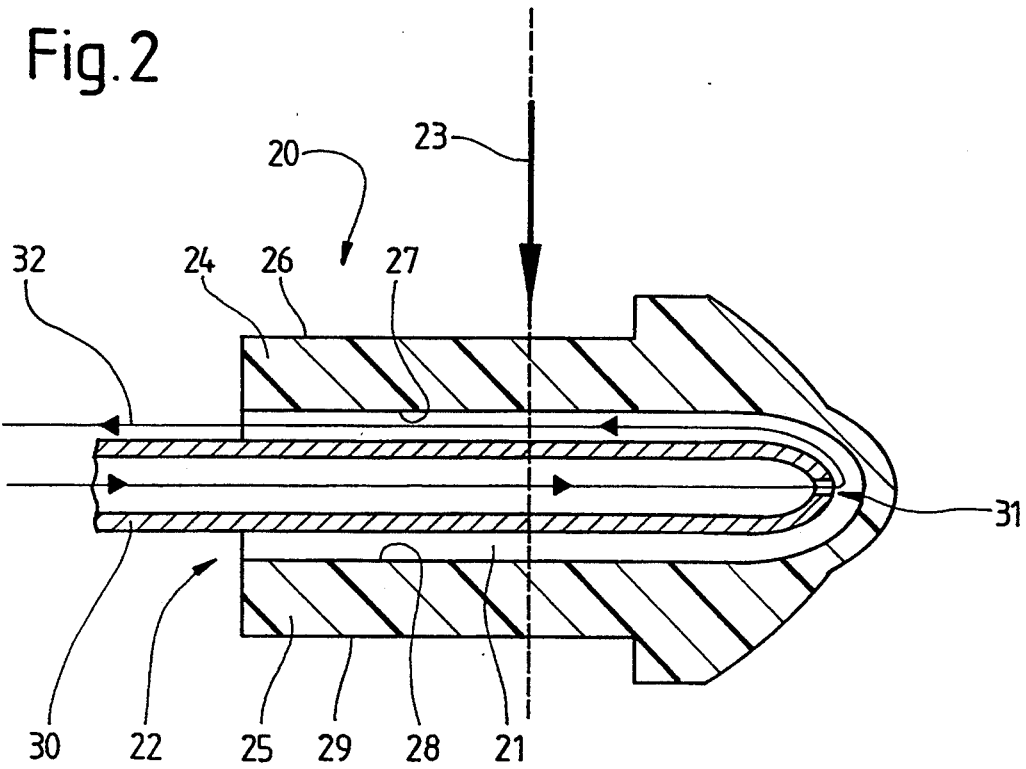
FIG. 2 is a schematic cross-sectional view of another device having a wall through which an aperture may be cut according to the method of the present invention; and, FIG. 3 is a schematic cross-sectional view of an apparatus used to perform the method of the present invention.

FIG. 2 shows a cross-sectional view of another device 20 which, unlike the device 1 of FIG. 1, has an opening or bore 21 with only one open end 22. The device 20 has two walls 24 and 25, each being bounded by opposing surfaces 26 and 27, and 28 and 29, respectively. As in FIG. 1, a laser beam 23 is caused to be incident upon the exterior surface 26, so as to cut through the wall 24 and form an aperture therethrough. In order to protect the surface 28 from damage by the laser beam 23, fluid may simply be introduced into the bore 21.

However, in order to that this fluid is able to flow between the surfaces 27 and 28, one end of a tube 30 is introduced into the open end 22 of the device 20. The inserted end of the tube 30 has an opening 31. A fluid supply is connected to the non-inserted end of the tube 30, so that fluid is caused to flow through the tube 30 and out of the opening 31. This fluid then leaves the bore 21 by flowing between the surfaces 27 and 28 and the exterior of the tube 30. Preferably, the opening 31 is smaller than the diameter of the tube 30, in order to increase the velocity of the fluid flowing between the surfaces 27 and 28 and the exterior of the tube 30. It will be appreciated that in an alternative embodiment, fluid may be caused to flow into the bore 21 around the exterior of the tube 30, through the opening 31 and flow out of the bore 21 in the interior of the tube 30.

Referring now to FIG. 3, there is shown schematically an apparatus 40 which may be used to perform the method of the present invention. The apparatus 40 basically comprises an X-Y table 41, a rotary support 42, a container 43, a cover 44, a focusing device 45, and a cutting jet 46. The device to be cut, in this case a piece of tubing 47, is held by the rotary support 42 so that it extends into the container 43. The X-Y table 41 is adapted to move in a plane perpendicular to the view show in FIG. 3, whilst the rotary support, 42, which is fixed relative to the X-Y table, is adapted to rotate the tube 47 about its longitudinal axis.

The focusing device 45 is fixed relative to the container 43 and is adapted to receive a laser beam 48 from an appropriate laser (not shown). The focusing device 45 focuses the laser beam 48 through the cutting jet 46 to a location 49 on the tube 47 at which it is desired to cut an aperture. The focusing device 45 may comprise a lens, focusing mirror or other suitable focusing means. This location may be selected by using the X-Y table 41 and the rotary support 42 to position and rotate the tube 47 within the container 43 as required. The cutting jet 46 provides a stream of assist gas, represented by the reference 50, which gas is supplied from within a cutting head 51, to the cutting location 49. The function of the assist gas is to blow out the molten material created by the laser beam 48 as it cuts through a wall of the tubing 47, rather than allowing it to solidify and degrade the finish of the cut surface. The assist gas also acts to keep the focusing means 45 clean from mist and splatter while cutting occurs. The assist gas may be typically oxygen, which assists the cutting action of the laser, but may also be clean shop air. Alternatively, nitrogen or argon may be used if an oxidization free cut is desired. It is to be appreciated, however, that the use of assist gas is not essential to the invention. Materials, such as diamond-based and silicon-based ceramics in particular, may be accurately cut without the use of an assist gas.

The assist gas is supplied to the cutting location 49 at a positive pressure, which in certain applications is typically in the order of 60 p.s.i. When an aperture is being cut in a particular device, the assist gas acts to blows some or all of the fluid away from between the wall through which the aperture is to be cut and the surface separated from the wall in the path of the laser beam (for example, between the surface 6 of the wall 2 and the surface 7 facing this wall, as shown in FIG. 1). In order to prevent damage to the surface which is in the path of the laser beam, it is therefore preferable, in applications where assist gas is used, that the fluid is caused to flow within the device.

For this reason, one end of the tube 47 also extends rearwardly of the rotary support 42, away from the container 43, over which is fitted a piece of hosing 52 so as to supply water from a conventional water outlet to the tube 47. The pressure at such a water outlet supply is typically between 80 and 120 p.s.i. It is to be appreciated that any number of alternative methods may also be used to supply fluid to the tube 47. As the water flows through the tube 47, it collects in the bottom of the container 43, from where it flows out of a drain outlet 53.

The pressure of the fluid supplied to the device to be cut and the separation of the surfaces between which the fluid flows will determine the speed with which the fluid flows. The desired speed at which the fluid flows will vary depending upon the application, and will depend on the selected energy of the laser and the pressure of the assist gas used.

While the preferred embodiments of the present invention have been described, it is to be understood that the invention is not limited thereto, and may be otherwise embodied within the scope of the following claims.

What is claimed is:

1. A method of cutting an aperture in a device by means of a laser beam, said device comprising a first surface, a bore extending partially through said device and defining a second surface opposed to said first surface, and a third surface separated from said second surface along the path of said laser beam, said bore having an open end and a closed end, and said method comprising the steps of:

inserting one end of an open-ended tube into the open end of said bore, causing said laser beam to be incident upon said first surface so as to cut through from said first surface to said second surface, and causing a fluid to flow along the interior of said tube and between the exterior to said tube and said second and third surfaces so as to prevent damage to said third surface when said laser beam has cut through from said first surface to said second surface.

2. A method of cutting an aperture in a device according to claim 1, wherein said one end of said tube has an opening smaller than the interior diameter of said tube.

3. A method of cutting an aperture in a device according to claim 1, wherein said fluid comprises water.

4. A method of cutting an aperture in a device according to claim 3, wherein said fluid further comprises an anti-corrosion agent.

5. A method of cutting an aperture in a device according to claim 4, wherein said anti-corrosion agent includes oil.

6. A method of cutting an aperture in a device according to claim 1, wherein an Nd.Yag laser is used to supply said laser beam.

7. A method of cutting an aperture in a device according to claim 1, wherein a $CO_2$ laser is used to supply said laser beam.

* * * * *